(12) United States Patent
Kodama

(10) Patent No.: US 8,995,000 B2
(45) Date of Patent: Mar. 31, 2015

(54) IMAGE FORMING SYSTEM, IMAGE FORMING APPARATUS, AND DISPLAY APPARATUS

(71) Applicant: Sharp Kabushiki Kaisha, Osaka-shi, Osaka (JP)

(72) Inventor: Hirotaka Kodama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/248,485

(22) Filed: Apr. 9, 2014

(65) Prior Publication Data

US 2014/0362400 A1  Dec. 11, 2014

(30) Foreign Application Priority Data

Jun. 5, 2013 (JP) .................................. 2013-119219

(51) Int. Cl.
*G06F 3/12* (2006.01)
*G06K 15/00* (2006.01)

(52) U.S. Cl.
CPC .......... *G06K 15/4055* (2013.01); *G06F 3/1293* (2013.01)
USPC ........... 358/1.15; 358/1.14; 345/1.1; 345/2.1; 345/3.1

(58) Field of Classification Search
CPC ................................ G06F 3/1423; G06F 3/147
USPC ..................... 358/1.15, 1.14; 345/1.1, 2.1, 3.1
See application file for complete search history.

(56) References Cited

U.S. PATENT DOCUMENTS

2013/0135659 A1* 5/2013 Ebi et al. ...................... 358/1.14

FOREIGN PATENT DOCUMENTS

| JP | 2005-138315 A | 6/2005 |
|---|---|---|
| JP | 2010-125616 A | 6/2010 |
| JP | 2011-173323 A | 9/2011 |

* cited by examiner

*Primary Examiner* — Jacky X Zheng
(74) *Attorney, Agent, or Firm* — Keating & Bennett, LLP

(57) ABSTRACT

In an image forming apparatus of an image forming system, a judging section judges, based on identification information included in print job data, whether a display apparatus corresponding to the print job data is a specific display apparatus. Based on a judgment result of the judging section, an image formation control section controls image forming operation of an image forming section. When it is judged by the judging section as being the specific display apparatus, this image formation control section suspends the image forming operation by the image forming section once. Further, when it is judged by the judging section as not being the specific display apparatus, the image formation control section causes the image forming operation by the image forming section to be executed promptly.

7 Claims, 9 Drawing Sheets

IMAGE FORMING SYSTEM, IMAGE FORMING APPARATUS, AND DISPLAY APPARATUS

CROSS-REFERENCE TO RELATED APPLICATION

This application claims priority to Japanese Patent Application No. 2013-119219, which was filed on Jun. 5, 2013, the contents of which are incorporated herein by reference in its entirety.

BACKGROUND OF THE TECHNOLOGY

1. Field of the Technology

The present technology relates to an image forming system for forming an image based on image data displayed on a display apparatus by an image forming apparatus, an image forming apparatus, and a display apparatus.

2. Description of the Related Art

As an information device for displaying and explaining various information for a plurality of viewers at meetings, business presentations, education, training and the like, a display apparatus such as an information display (IDP) is used. This IDP is often configured to have a large screen and further to have a coordinate input section such as a touch panel and a display section such as a liquid crystal display integrated.

This IDP is able to display image data on the display section, and is able to edit, with respect to an image displayed on the display section, the displayed image in real time such as by inputting handwritten characters using a touch panel.

The IDP is often used in a conference hall or a presentation hall as described above, and image data that has been edited on the display section is often printed and distributed to viewers as materials after explanation based on the image data displayed on the display section is finished as well. In such a case, a display apparatus that is the IDP and an image forming apparatus for printing the image data are connected so as to allow data communication, which are configured as an image forming system.

In such an image forming system, print job data including image data is transmitted from the display apparatus such as the IDP, and the image forming apparatus that has received the transmitted print job data forms an image based on the image data included in the print job data on a recording medium such as recording paper by heating and pressing with an electrophotographic system.

As to the image forming apparatus constituting the image forming system, an image forming apparatus capable of switching a power-saving state and an image formation enabled state to reduce power consumption has been proposed. In the image forming apparatus capable of switching a state, the power-saving state is set during a standby period of image forming operation that print job data is not received from a display apparatus such as an IDP, and when print job data is received from the display apparatus, the power-saving state is cancelled and the image formation enabled state is set.

In the image forming system including the image forming apparatus as described above, in a case where print job data is received from the display apparatus in the power-saving state, each time print job data is received, returning operation for cancelling the power-saving state to switch to the image formation enabled state (that is, heating operation) becomes necessary, so that power required for the returning operation becomes wasted.

Technologies for solving such a problem are disclosed, for example, in Japanese Unexamined Patent Publications JP-A 2011-173323 and JP-A 2010-125616. According to image forming systems disclosed in JP-A 2011-173323 and JP-A 2010-125616, when receiving print job data from a display apparatus in the power-saving state, an image forming apparatus temporarily stores the print job data in a storage section and suspends image forming operation once to collectively execute the image forming operation corresponding to a plurality of print job data stored in the storage section at a time. Thereby, the number of times of the returning operation for cancelling the power-saving state to switch to the image formation enabled state is reduced, and it is possible to suppress wasteful power consumption accordingly.

However, in the image forming systems disclosed in JP-A 2011-173323 and JP-A 2010-125616, since it is configured such that the image forming apparatus, when receiving print job data from the display apparatus, temporarily stores the print job data in the storage section and suspends the image forming operation once, there is a problem that, in a case where the image forming apparatus is shared by a plurality of display apparatuses, for example, even when the image forming apparatus receives print job data that is desired to be printed immediately from other display apparatus than the IDP, the image forming operation is suspended.

SUMMARY OF THE TECHNOLOGY

An object of the technology is to provide an image forming system capable of suppressing wasteful power consumption as well as capable of printing immediately with respect to a print job that needs to be printed immediately, an image forming apparatus, and a display apparatus.

The technology provides an image forming system comprising:

a plurality of display apparatuses including a specific display apparatus capable of displaying an image based on image data; and an image forming apparatus which forms the image on a recording medium, the plurality of display apparatuses and the image forming apparatus being connected so as to allow data communication, each of the plurality of display apparatuses including a display section which displays the image based on the image data, a transmission instruction input section to which a transmission instruction to transmit the image data of the image displayed on the display section to the image forming apparatus is inputted, an image formation job generating section which adds identification information for identifying a display apparatus on which the image is displayed, to image data which is a target for the transmission instruction, and generates an image formation job for causing the image forming apparatus to perform image formation of the image based on the image data, when the transmission instruction is inputted to the transmission instruction input section, and a transmitting section which transmits the image formation job generated by the image formation job generating section, to the image forming apparatus, and the image forming apparatus including a receiving section which receives the image formation job transmitted by the transmitting section, an image forming section which forms the image based on the image data included in the image formation job received by the receiving section on the recording medium, a judging section which judges whether a display apparatus corresponding to the image formation job is the specific display apparatus, based on the identification information included in the image formation job, and a control section which controls image forming operation for the recording medium by the image forming section, based on a judgment result of the judging section, when the judging section judges as being the specific display apparatus, the control section suspending the image forming operation by the image forming section once, and then, when a predetermined condition is satisfied, the control section cancelling the suspension to cause the image forming operation to be executed, and when the judging section judges as not being the specific display apparatus, the control section causing the image forming operation by the image forming section to be executed without being suspended.

Further, the technology provides an image forming system comprising:

a display apparatus capable of displaying an image based on image data; and an image forming apparatus which forms the image on a recording medium, the display apparatus and the image forming apparatus being connected so as to allow data communication, the display apparatus including a display section which displays the image based on the image data, a transmission instruction input section to which a transmission instruction to transmit the image data of the image displayed on the display section to the image forming apparatus is inputted, an image formation job generating section which adds identification information for identifying the image data to image data which is a target for the transmission instruction, and generates an image formation job for causing the image forming apparatus to perform image formation of the image based on the image data, when the transmission instruction is inputted to the transmission instruction input section, a storage section which stores the image formation job generated by the image formation job generating section, a detecting section which detects a state of display operation of the image by the display section, and a transmitting section which transmits the image formation job stored in the storage section to the image forming apparatus when the state of the display operation detected by the detecting section is a state of satisfying a predetermined condition, and the image forming apparatus including a receiving section which receives the image formation job transmitted by the transmitting section, and an image forming section which forms the image based on the image data included in the image formation job received by the receiving section on the recording medium.

Further, the technology provides an image forming apparatus connected to a plurality of display apparatuses including a specific display apparatus so as to allow data communication, each of the plurality of display apparatuses including a display section capable of displaying an image based on image data, an image formation job generating section which adds identification information for identifying each of the plurality of display apparatuses to each of the image data and generates an image formation job for causing the image forming apparatus to perform image formation of the image based on the image data, and a transmitting section for transmitting the image formation job, the image forming apparatus comprising:

a receiving section which receives the image formation job transmitted by each transmitting section of each of the display apparatuses;

an image forming section which forms the image based on the image data included in the image formation job received by the receiving section on a recording medium;

a judging section which judges whether a display apparatus corresponding to the image formation job is the specific display apparatus, based on the identification information included in the image formation job; and a control section which controls image forming operation for the recording medium by the image forming section, based on a judgment result of the judging section, when the judging section judges as being the specific display apparatus, the control section suspending the image forming operation by the image forming section once, and then, when a predetermined condition is satisfied, the control section cancelling the suspension to cause the image forming operation to be executed, when the judging section judges as not being the specific display apparatus, the control section causing the image forming operation by the image forming section to be executed without being suspended.

Further, it is preferable that the image forming apparatus further comprises a state setting section which sets a state of the image forming section to either an image formation enabled state or a power-saving state in which power consumption is reduced compared to the image formation enabled state, and during a period when the control section is suspending the image forming operation by the image forming section, the state setting section sets the image forming section to the power-saving state, and during a period when the control section is causing the image forming operation by the image forming section to be executed, the state setting section sets the image forming section to the image formation enabled state.

Further, it is preferable that, in the image forming apparatus, the plurality of display apparatuses connected so as to allow data communication are configured so as to be able to transmit an image formation instructing signal indicating an execution instruction of the image forming operation, the image forming apparatus further comprises an instructing signal reception judging section which judges whether the image formation instructing signal transmitted from the specific display apparatus is received via the receiving section, and when it is judged by the instructing signal reception judging section that the image formation instructing signal is received, the control section judges that the predetermined condition is satisfied, and cancels the suspension of the image forming operation which is carried out by the image forming section and corresponds to the image formation job transmitted from the specific display apparatus.

Further, it is preferable that, in the image forming apparatus, the plurality of display apparatuses connected so as to allow data communication are configured so as to be able to transmit a display operation end signal indicating to end display operation of the image therein, the image forming apparatus further comprises an end signal reception judging section which judges whether the display operation end signal transmitted from the specific display apparatus is received via the receiving section, and when it is judged by the end signal reception judging section that the display operation end signal is received, the control section judges that the predetermined condition is satisfied, and cancels the suspension of the image forming operation which is carried out by the image forming section and corresponds to the image formation job transmitted from the specific display apparatus.

Further, the technology provides a display apparatus connected to an image forming apparatus which forms an image based on image data on a recording medium, so as to allow data communication, comprising:

a display section capable of displaying the image based on the image data;

a transmission instruction input section to which a transmission instruction to transmit the image data of the image displayed on the display section to the image forming apparatus is inputted;

an image formation job generating section which adds identification information for identifying the image data to image data which is a target for the transmission instruction, and generates an image formation job for causing the image forming apparatus to perform image formation of the image based on the image data, when the transmission instruction is inputted to the transmission instruction input section;

a storage section which stores the image formation job generated by the image formation job generating section;

a detecting section which detects a state of display operation of the image by the display section; and a transmitting section which transmits the image formation job stored in the storage section to the image forming apparatus when the state of the display operation detected by the detecting section is a state of satisfying a predetermined condition.

Further, it is preferable that, in the display apparatus, when the state of the display operation detected by the detecting section is a state of ending the display operation, it is judged that the predetermined condition is satisfied, and the transmitting section transmits the image formation job stored in the storage section to the image forming apparatus.

Further, it is preferable that, the display apparatus further includes a list creating section which creates an image formation job list indicating a list of image formation jobs stored in the storage section to cause the display section to display the created image formation job list when the state of the display operation detected by the detecting section is a state of ending the display operation, and an image formation job extracting section which extracts an image formation job that is instructed to be selected by a user based on the image formation job list displayed on the display section, and the transmitting section transmits the image formation job extracted by the image formation job extracting section, to the image forming apparatus.

Further, it is preferable that the display apparatus further comprises an image formation job deleting section which deletes the transmitted image formation job from the storage section when the image formation job is transmitted by the transmitting section.

An image forming system is a system comprising a plurality of display apparatuses and an image forming apparatus, the plurality of display apparatuses and the image forming apparatus being connected so as to allow data communication. In the image forming apparatus constituting this image forming system, based on identification information included in an image formation job (print job data) transmitted from a display apparatus, a judging section judges whether a display apparatus corresponding to the print job data is a specific display apparatus. Then, a control section controls image forming operation for a recording medium by an image forming section based on a judgment result of the judging section. When the judging section judges as being the specific display apparatus, the control section once suspends the image forming operation which is carried out by the image forming section and corresponds to the print job data transmitted from the specific display apparatus that has been judged, and then, when a predetermined condition is satisfied, the control sections cancels the suspension to cause the image forming operation to be executed. Further, when the judging section judges as not being the specific display apparatus, the control section causes the image forming operation which is carried out by the image forming section and corresponds to the print job data transmitted from the display apparatus that has been judged to be executed promptly without being suspended.

In the image forming system configured as described above, the image forming operation corresponding to print job data transmitted from the specific display apparatus such as an information display is suspended once, so that it is possible to suppress wasteful power consumption, and further, the image forming operation corresponding to print job data transmitted from the display apparatus other than the specific display apparatus is executed promptly without being suspended, so that it is possible to perform printing immediately for a print job that is needed to be printed immediately.

Further, an image forming system is a system comprising a display apparatus and an image forming apparatus, the display apparatus and the image forming apparatus being connected so as to allow data communication. In the display apparatus constituting this image forming system, each time a transmission instruction to transmit image data displayed on a display section to the image forming apparatus is inputted by a user, a generating section adds identification information for identifying each image data to each image data corresponding to the transmission instruction respectively and generates an image formation job (print job data). The print job data generated by this generating section is stored in a storage section once. Then, a detecting section detects a state of display operation of the image data by the display section, and when the state of the display operation detected by the detecting section is a state of satisfying a predetermined condition, a transmitting section transmits the print job data stored in the storage section to the image forming apparatus. The image forming apparatus that has received the print job data transmitted in this manner forms an image based on the image data included in the print job data on a recording medium.

The image forming system configured as described above is not configured so that the image forming apparatus suspends the image forming operation corresponding to print job data once, but configured so that the display apparatus such as an information display stores the print job data including the image data corresponding to the transmission instruction by the user in the storage section once without transmitting to the image forming apparatus immediately. Further, at the time when receiving the print job data transmitted from the display apparatus, the image forming apparatus executes the image forming operation for the recording medium. This makes it possible to suppress wasteful power consumption as well as to perform printing immediately for a print job that is needed to be printed immediately.

Further, an image forming apparatus is connected to a plurality of display apparatuses so as to allow data communication. In this image forming apparatus, based on identification information included in an image formation job (print job data) transmitted from a display apparatus, a judging section judges whether a display apparatus corresponding to the print job data is a specific display apparatus. Then, a control section controls image forming operation for a recording medium by an image forming section based on a judgment result of the judging section. When the judging section judges as being the specific display apparatus, the control section once suspends the image forming operation which is carried out by the image forming section and corresponds to the print job data transmitted from the specific display apparatus that has been judged, and then, when a predetermined condition is satisfied, the control section cancels the suspension to cause the image forming operation to be executed. Further, when the judging section judges as not being the specific display apparatus, the control section causes the image forming operation which is carried out by the image forming section and corresponds to the print job data transmitted from the display apparatus that has been judged to be executed promptly without being suspended.

In the image forming apparatus configured as described above, the image forming operation corresponding to the print job data transmitted from the specific display apparatus such as an information display is suspended once, so that it is possible to suppress wasteful power consumption, and further, the image forming operation corresponding to the print job data transmitted from the display apparatus other than the specific display apparatus is executed promptly without being suspended, so that it is possible to perform printing immediately for a print job that is needed to be printed immediately.

Further, a display apparatus is connected to an image forming apparatus so as to allow data communication. In this display apparatus, each time a transmission instruction to transmit image data displayed on a display section to the image forming apparatus is inputted by a user, an image formation job generating section adds identification information for identifying each image data to each image data corresponding to the transmission instruction respectively and generates an image formation job (print job data). The print job data generated by this generating section is stored in a storage section once. Then, a detecting section detects a state of display operation of the image data by the display section, and when the state of the display operation detected by the detecting section is a state of satisfying a predetermined condition, a transmitting section transmits the print job data stored in the storage section to the image forming apparatus.

The display apparatus configured as described above is configured so that the print job data including the image data corresponding to the transmission instruction by the user is stored in the storage section once without transmitting to the image forming apparatus immediately. This makes it possible to suppress wasteful power consumption. Further, since the display apparatus is configured so as to be able to suppress wasteful power consumption, the image forming apparatus does not need to be configured so as to suspend the image forming operation corresponding to the print job data once. As a result, the image forming apparatus connected to the display apparatus so as to allow data communication is able to perform printing immediately for a print job that is needed to be printed immediately.

BRIEF DESCRIPTION OF THE DRAWINGS

Other and further objects, features, and advantages of the technology will be more explicit from the following detailed description taken with reference to the drawings wherein.

DETAILED DESCRIPTION

Figure 1:
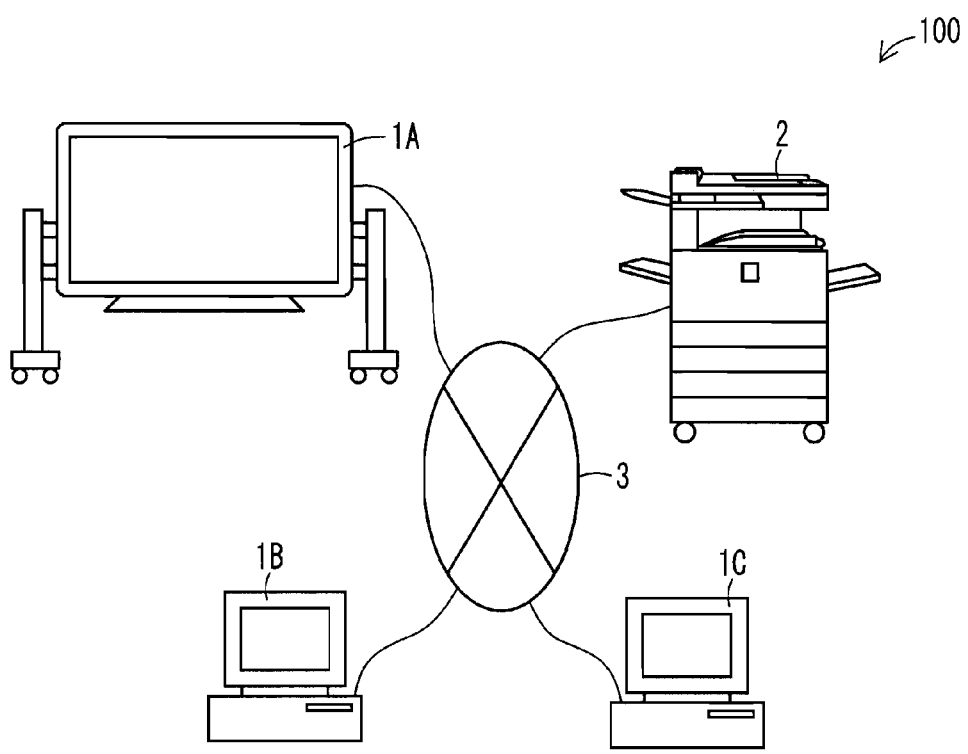
FIG. 1 is a view schematically showing a configuration of an image forming system according to a first embodiment.

Now referring to the drawings, preferred embodiments are described below.

Figure 2:
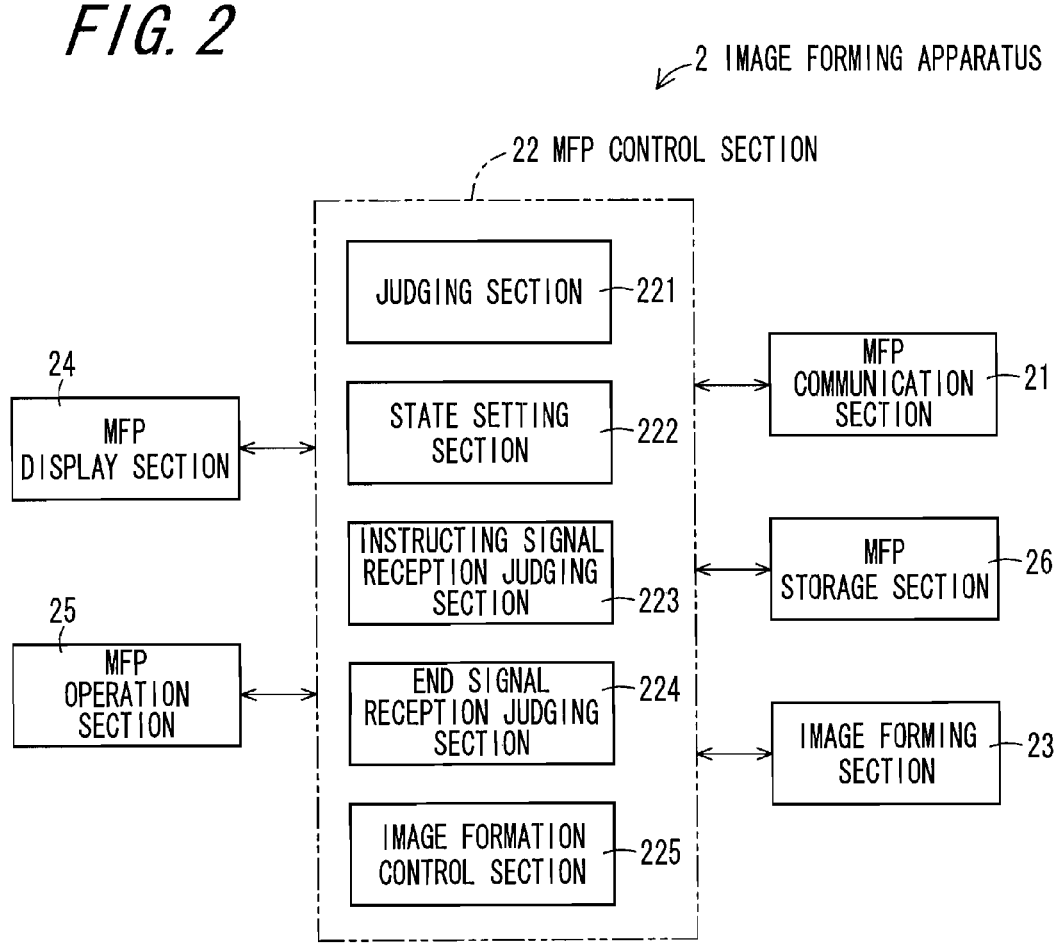
FIG. 2 is a block diagram showing a configuration of an image forming apparatus provided in the image forming system.
Figure 3:
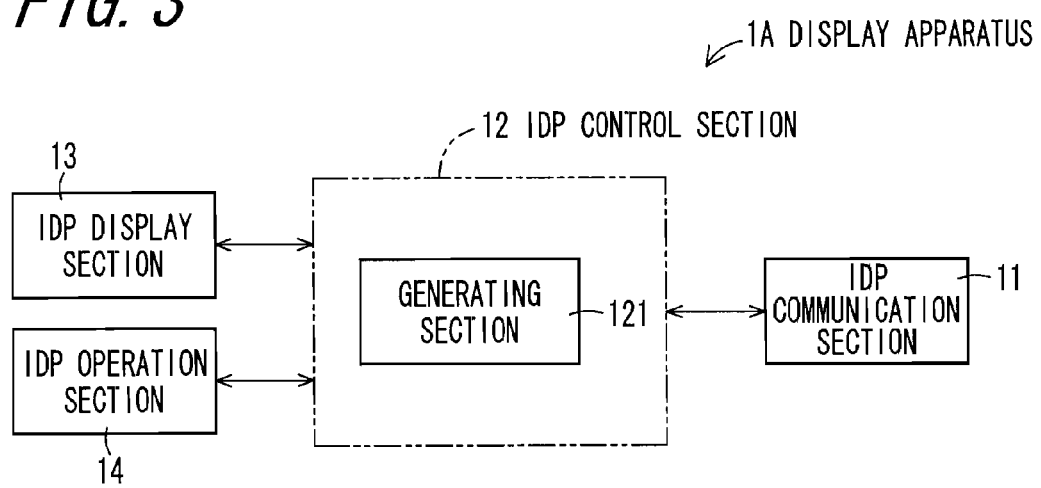
FIG. 3 is a block diagram showing a configuration of a display apparatus provided in the image forming system.

FIG. 1 is a view schematically showing a configuration of an image forming system 100 according to a first embodiment. FIG. 2 is a block diagram showing a configuration of an image forming apparatus 2 provided in the image forming system 100. FIG. 3 is a block diagram showing a configuration of a display apparatus 1A provided in the image forming system 100.

The image forming system 100 is a system comprising a plurality of display apparatuses 1A, 1B and 1C capable of displaying image data and the image forming apparatus 2 for forming an image based on the image data on a recording medium such as recording paper, the plurality of display apparatuses 1A, 1B and 1C and the image forming apparatus 2 being connected so as to allow data communication via a communication network 3.

Description will hereinafter be given assuming that, among the plurality of display apparatuses 1A, 1B and 1C constituting the image forming system 100, the display apparatus 1A is an information display (IDP) for displaying and explaining various information for a plurality of viewers at meetings, business presentations and the like, and the display apparatuses 1B and 1C are display apparatuses, other than the IDP, such as a PC (Personal Computer) having a display section capable of displaying image data. Note that, hereinafter, the display apparatus 1A may be referred to as an "IDP apparatus 1A".

As shown in FIG. 3, the IDP apparatus 1A includes an IDP communication section 11, an IDP control section 12 having a generating section 121, an IDP display section 13, and an IDP operation section 14.

The IDP display section 13 and the IDP operation section 14 are realized by a so-called touch panel having a rectangular display face that is subjected to touch operation by a user, the touch panel being contained in a housing so as to expose the display face to the outside. The IDP display section 13 is for displaying an image based on image data created by various application programs. This IDP display section 13 is realized by a publicly known display device, for example, such as a liquid crystal display device including a liquid crystal panel and a backlight or an organic EL (Electro-Luminescence) display device.

The IDP operation section 14 is realized by a touch sensor placed on the IDP display section 13. The IDP operation section 14 realized by the touch sensor functions as a touched position detecting section, and is realized by, for example, a projection-type electrostatic capacitance sensor for outputting coordinate information corresponding to a touched position on the display face of touching operation performed on the display face of the IDP display section 13 by a user using a finger, a stylus or the like to the IDP control section 12. Such an IDP operation section 14 functions as an input section to which various instructions given by the user are inputted, and functions as an image editing section that executes drawing or deletion of handwritten characters or the like by the user with respect to an image based on the image data displayed on the IDP display section 13. Note that, a mouse and an operation keyboard provided in the IDP apparatus 1A also function as the IDP operation section 14.

As described below, in the IDP operation section 14, an execution instruction of an application program, a transmission instruction to transmit image data displayed on the IDP display section 13 to the image forming apparatus 2, an execution instruction of image forming operation, and an end instruction of display operation of image data in the display apparatus are inputted by the user respectively.

The IDP control section 12 is a processing section for controlling the operation of each section of the IDP apparatus 1A, and is realized by, for example, a CPU (Central Processing Unit), a ROM (Read Only Memory) and a RAM (Random Access Memory). This IDP control section 12 includes the generating section 121.

The IDP control section 12 executes an operating system (OS) program that realizes basic functions of the IDP apparatus 1A as well as executes various application programs such as a word processing software program, a spreadsheet software program, and a drawing software program.

The generating section 121 of the IDP control section 12 functions as an image formation job generating section, and each time a transmission instruction (instruction to transmit image data displayed on the IDP display section 13 to the image forming apparatus 2) is inputted to the IDP operation section 14 by the user, the generating section 121 adds identification information for identifying each of the plurality of display apparatuses to each of image data which is a target for the transmission instruction and generates print job data (image formation job) subjected to image formation by the image forming apparatus 2.

The IDP communication section 11 performs transmission or reception of various data to or from the image forming apparatus 2 connected via the communication network 3. This IDP communication section 11 transmits the print job data generated by the generating section 121 to the image forming apparatus 2.

Next, description will be given for the image forming apparatus 2 included in the image forming system 100. The image forming apparatus 2 such as an MFP (Multi Function Printer) is an apparatus that forms (prints) an image based on image data displayed on the IDP apparatus 1A and the display apparatuses 1B and 1C on a recording medium such as recording paper. Note that, hereinafter, the image forming apparatus 2 may be referred to as an "MFP apparatus 2".

As shown in FIG. 2, the MFP apparatus 2 includes an MFP communication section 21, an MFP control section 22, an image forming section 23, an MFP display section 24, an MFP operation section 25, and an MFP storage section 26.

The MFP display section 24 and the MFP operation section 25 are realized by, for example, a display device provided with a touch panel. The MFP operation section 25 functions as an input section to which various instructions given by a user are inputted. The MFP display section 24 displays an operation key image indicating an input position of various instructions inputted by the MFP operation section 25, a preview image corresponding to an image to be printed, and the like.

The MFP communication section 21 performs transmission or reception of various data to or from the IDP apparatus 1A and the display apparatuses 1B and 1C connected via the communication network 3. This MFP communication section 21 receives print job data transmitted by the IDP communication section 11 of the IDP apparatus 1A or communication sections of the display apparatuses 1B and 1C.

The MFP storage section 26 stores the print job data received by the MFP communication section 21.

The image forming section 23 forms (prints) an image based on the image data included in the print job data on a recording medium by heating and pressing with an electrophotographic system. The image forming operation by the image forming section 23 is controlled by an image formation control section 225 described below.

The MFP control section 22 is a processing section for controlling the operation of each section of the MFP apparatus 2, and is realized by, for example, a CPU (Central Processing Unit), a ROM (Read Only Memory) and a RAM (Random Access Memory). This MFP control section 22 includes a judging section 221, a state setting section 222, an instructing signal reception judging section 223, an end signal reception judging section 224, and an image formation control section 225.

The judging section 221 judges, based on identification information included in the print job data, whether a display apparatus corresponding to the print job data is a specific display apparatus. In this embodiment, the IDP apparatus 1A is treated as the specific display apparatus among the IDP apparatus 1A and the display apparatuses 1B and 1C.

The image formation control section 225 controls the image forming operation for a recording medium by the image forming section 23 based on a judgment result of the judging section 221. When it is judged by the judging section 221 that the display apparatus corresponding to the print job data is the IDP apparatus 1A, the image formation control section 225 once suspends the image forming operation which is carried out by the image forming section 23 and corresponds to the print job data transmitted from the IDP apparatus 1A that has been judged, and then, when a predetermined condition is satisfied, the image formation control section 225 cancels the suspension to cause the image forming operation to be executed. Further, when it is judged by the judging section 221 that the display apparatus corresponding to the print job data is not the IDP apparatus 1A (but the display apparatus 1B or 1C), the image formation control section 225 causes the image forming operation which is carried out by the image forming section 23 and corresponds to the print job data transmitted from the display apparatus 1B or 1C that has been judged to be executed promptly without being suspended.

The state setting section 222 sets a state of the image forming section 23 to either an image formation enabled state or a power-saving state (energy-saving mode) in which power consumption is reduced compared to the image formation enabled state. The state setting section 222 sets the image forming section 23 to the power-saving state (energy-saving mode) during a period when the image formation control section 225 is suspending the image forming operation by the image forming section 23. Further, the state setting section 222 returns the image forming section 23 from the power-saving state (energy-saving mode) to set to the image formation enabled state during a period when the image formation control section 225 is causing the image forming operation by the image forming section 23 to be executed.

The instructing signal reception judging section 223 judges whether an image formation instructing signal indicating an execution instruction of the image forming operation (printing execution job data) transmitted from the IDP apparatus 1A is received via the MFP communication section 21. Note that, in the IDP apparatus 1A, the execution instruction of the image forming operation is inputted by the user via the IDP operation section 14.

The end signal reception judging section 224 judges whether a display operation end signal indicating an end instruction of the display operation of image data in the display apparatus (meeting end job data) transmitted from the IDP apparatus 1A is received via the MFP communication section 21. Note that, in the IDP apparatus 1A, the end instruction of the display operation is inputted by the user via the IDP operation section 14. An example of the end instruction of the display operation includes an instruction to end a drawing software program in execution by the IDP control section 12 or the like.

Description will be given for specific operation control using the judgment results of the instructing signal reception judging section 223 and the end signal reception judging section 224, as to operation control for the image forming section 23 by the image formation control section 225.

As described above, when it is judged by the judging section 221 that the display apparatus corresponding to the print job data is the IDP apparatus 1A, the image formation control section 225 once suspends the image forming operation which is carried out by the image forming section 23 and corresponds to the print job data transmitted from the IDP apparatus 1A that has been judged, and then, when a predetermined condition is satisfied, the image formation control section 225 cancels the suspension to cause the image forming operation to be executed.

Specifically describing "when a predetermined condition is satisfied" described above, when it is judged by the instructing signal reception judging section 223 that the image formation instructing signal (printing execution job data) is received, the image formation control section 225 judges that the predetermined condition is satisfied, and cancels the suspension of the image forming operation which is carried out by the image forming section 23 and corresponds to the print job data transmitted form the IDP apparatus 1A.

Further, when it is judged by the end signal reception judging section 224 that the display operation end signal (meeting end job data) is received, the image formation control section 225 judges that the predetermined condition is satisfied, and cancels the suspension of the image forming operation which is carried out by the image forming section 23 and corresponds to the print job data transmitted form the IDP apparatus 1A.

Next, description will be given for processing of the MFP apparatus 2 (image forming apparatus 2) and processing of the IDP apparatus 1A (display apparatus 1A) as to image processing in the image forming system 100 configured as described above.

Figure 4:
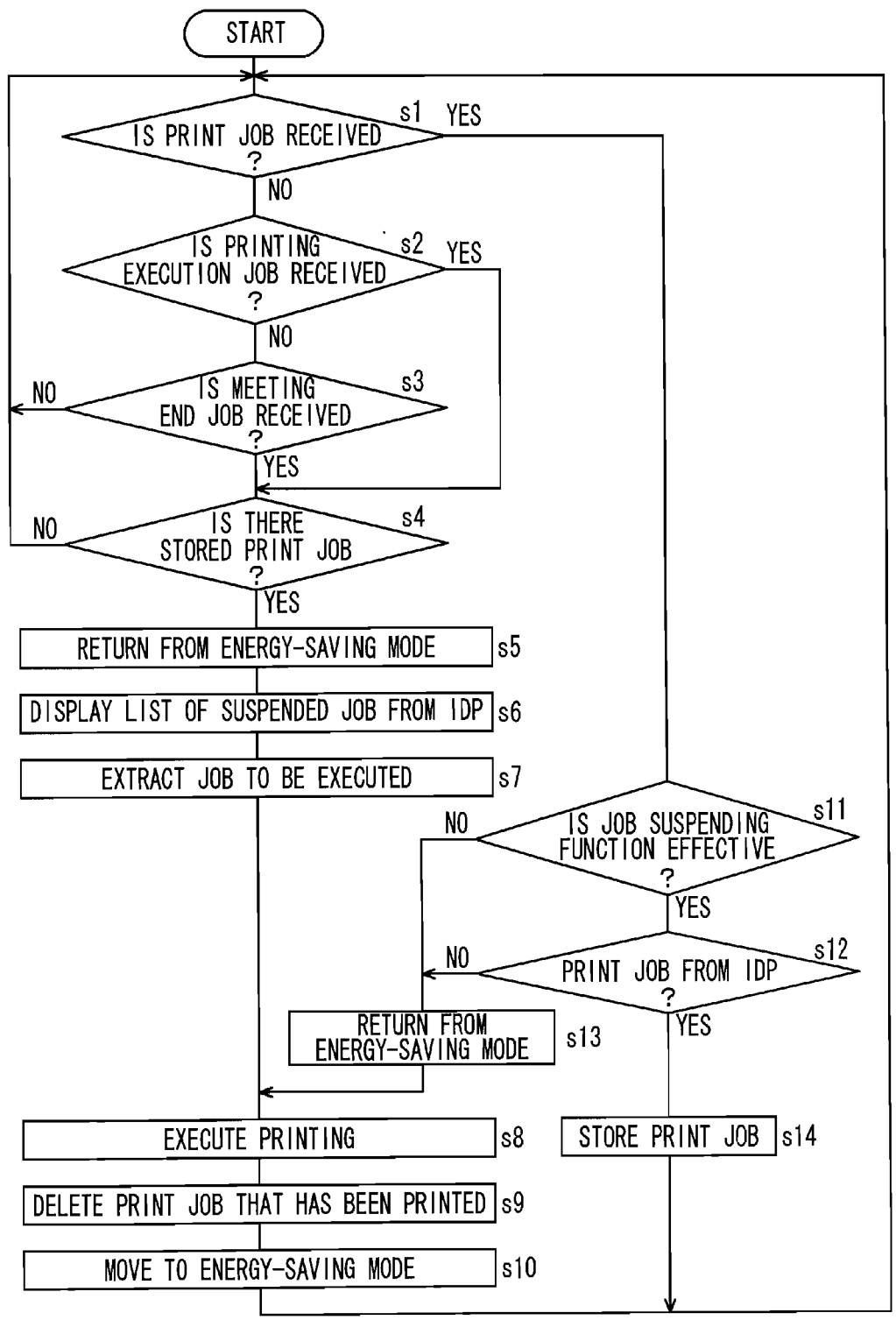
FIG. 4 is a flowchart showing processing of the image forming apparatus in the image forming system.

FIG. 4 is a flowchart showing processing of the MFP apparatus 2 (image forming apparatus 2) in the image forming system 100.

At step s1, the MFP control section 22 judges whether print job data is received by the MFP communication section 21. When the MFP control section 22 judges that the print job data is received by the MFP communication section 21, the processing proceeds to step s11, and when it is judged that the print job data is not received, the processing proceeds to step s2.

At step s2, the instructing signal reception judging section 223 judges whether an image formation instructing signal (printing execution job data) transmitted from the IDP apparatus 1A is received via the MFP communication section 21. Further, at this step s2, the MFP control section 22 judges whether an execution instruction of the image forming operation is inputted via the MFP operation section 25. When the execution instruction of the image forming operation is inputted via the MFP operation section 25, processing in the following steps is the same processing as a case where the image formation instructing signal (printing execution job data) is received. When it is judged that the image formation instructing signal (printing execution job data) is received, the processing proceeds to step s4, and when it is judged that the image formation instructing signal (printing execution job data) is not received, the processing proceeds to step s3.

At step s3, the end signal reception judging section 224 judges whether a display operation end signal (meeting end job data) transmitted from the IDP apparatus 1A is received via the MFP communication section 21. When it is judged that the display operation end signal (meeting end job data) is received, the processing proceeds to step s4, and when it is judged that the display operation end signal (meeting end job data) is not received, the processing returns to step s1.

At step s4, the MFP control section 22 judges whether the print job data is stored in the MFP storage section 26. When the MFP control section 22 judges that the print job data is stored, the processing proceeds to step s5, and when judging that the print job data is not stored, the processing returns to step s1.

At step s5, the state setting section 222 executes returning operation for the image forming section 23 that is set to the power-saving state (energy-saving mode) to set the image forming section 23 to the image formation enabled state.

Next, at step s6, the MFP control section 22 causes the MFP display section 24 to display a list indicating a list of the print job data stored in the MFP storage section 26 (that is print job data transmitted from the IDP apparatus 1A and is data temporarily stored in the MFP storage section 26). Note that, at this step s6, the MFP control section 22 may cause the MFP display section 24 to display a print preview image corresponding to the print job data stored in the MFP storage section 26.

Next, at step s7, the MFP control section 22 extracts the print job data that is instructed to be selected by the user via the MFP operation section 25 with respect to the list (or the print preview image) displayed on the MFP display section 24.

Next, at step s8, the image formation control section 225 controls the image forming operation of the image forming section 23 to form (print) an image based on image data included in the extracted print job data on a recording medium.

Next, at step s9, the MFP control section 22 deletes the print job data that has been printed from the MFP storage section 26. Next, at step s10, the state setting section 222 executes power-saving operation for the image forming section 23 that is set to the image formation enabled state to set the image forming section 23 to the power-saving state (energy-saving mode).

At step s11 after it is judged that the print job data is received by the MFP communication section 21 at step s1, the MFP control section 22 judges whether the MFP apparatus 2 is set to a state where a print job suspending function is effective. When it is judged as being set to the state where the print job suspending function is effective, the processing proceeds to step s12, and when it is judged as not being set to the state where the suspending function is effective, the processing proceeds to step s13.

At step s12, as to the print job data received via the MFP communication section 21, the judging section 221 judges whether a display apparatus corresponding to the print job data is the IDP apparatus 1A (specific display apparatus) based on identification information included in the print job data. When it is judged as being the IDP apparatus 1A by the judging section 221, the processing proceeds to step s14, and when it is judged as not being the IDP apparatus 1A (but as being the display apparatus 1B or 1C) by the judging section 221, the processing proceeds to step s13.

At step s13, the state setting section 222 executes the returning operation for the image forming section 23 that is set to the power-saving state (energy-saving mode) to set the image forming section 23 to the image formation enabled state. When the image forming section 23 is set to the image formation enabled state in this manner, the processing proceeds to step s8 described above, and the image forming section 23 forms (prints) the image based on the image data included in the print job data received via the MFP communication section 21 on a recording medium.

At step s14, the MFP control section 22 causes the MFP storage section 26 to store the print job data transmitted from the IDP apparatus 1A. Thereby, the image forming operation corresponding to the print job data transmitted from the IDP apparatus 1A is not executed promptly but suspended once. When the print job data is stored in the MFP storage section 26 in this manner, the MFP control section 22 operates so that the processing proceeds to step s1.

Figure 5:
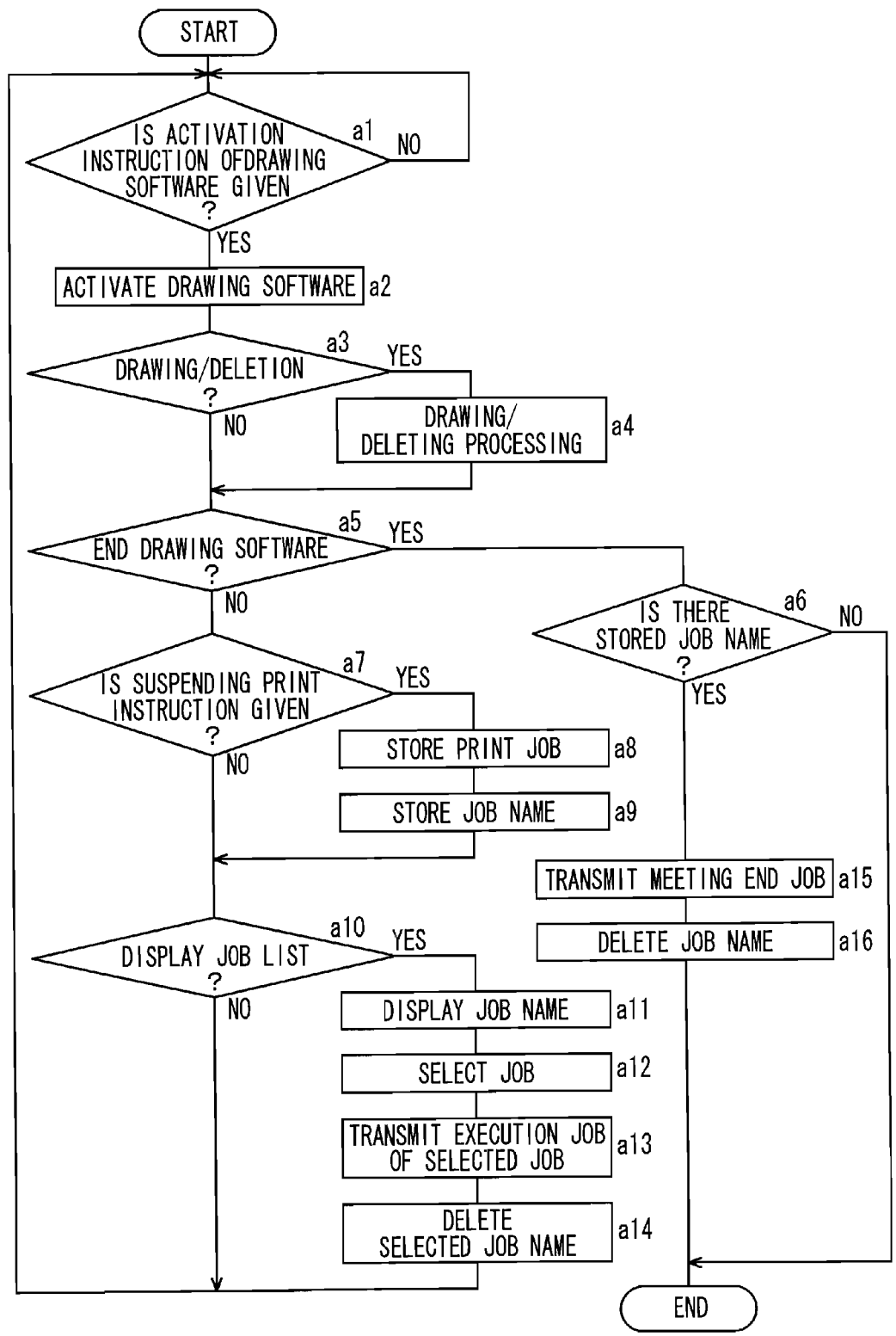
FIG. 5 is a flowchart showing processing of the display apparatus in the image forming system.

FIG. 5 is a flowchart showing processing of the IDP apparatus 1A (display apparatus 1A) in the image forming system 100.

At step a1, the IDP control section 12 judges whether an activation instruction of a drawing software program for executing editing processing with respect to image data displayed on the IDP display section 13 is inputted via the IDP operation section 14. When it is judged that the activation instruction of the drawing software program is inputted, the processing proceeds to step a2, and when it is judged that the activation instruction is not inputted, step a1 is repeated.

At step a2, the IDP control section 12 activates the drawing software program. Next, at step a3, the IDP control section 12 judges whether an edit instruction of drawing or deletion using drawing software is inputted via the IDP operation section 14. When it is judged that the edit instruction is inputted, the processing proceeds to step a4, and when it is judged that the edit instruction is not inputted, the processing proceeds to step a5.

At step a4, the IDP control section 12 executes editing processing with respect to the image data displayed on the IDP display section 13 based on the edit instruction inputted via the IDP operation section 14. When the editing processing is executed in this manner and the editing processing is completed, the IDP control section 12 operates so that the processing proceeds to step a5.

At step a5, the IDP control section 12 judges whether an end instruction of the drawing software program is inputted via the IDP operation section 14. When it is judged that the end instruction of the drawing software program is inputted, the processing proceeds to step a6, and when it is judged that the end instruction is not inputted, the processing proceeds to step a7.

At step a7, the IDP control section 12 judges whether a transmission instruction to transmit the image data displayed on the IDP display section 13 to the MFP apparatus 2 is inputted via the IDP operation section 14. When it is judged that the transmission instruction is inputted, the processing proceeds to step a8, and when it is judged that the transmission instruction is not inputted, the processing proceeds to step a10.

At step a8, each time the transmission instruction of image data is inputted via the IDP operation section 14, the generating section 121 of the IDP control section 12 adds identification information for identifying each of the plurality of display apparatuses to each image data corresponding to the transmission instruction respectively and generates print job data. Then, the IDP control section 12 causes the print job data generated by the generating section 121 to be transmitted to the MFP apparatus 2 via the IDP communication section 11.

Next, at step a9, as to the print job data transmitted via the IDP communication section 11, the IDP control section 12 causes the storage section to store a job name or a preview image for identifying the print job data.

Next, at step a10, the IDP control section 12 judges whether a job list display instruction to cause the IDP display section 13 to display a job list indicating a list of job names or preview images for identifying the print job data is inputted via the IDP operation section 14. When it is judged that the job list display instruction is inputted, the processing proceeds to step a11, and when it is judged that the job list display instruction is not inputted, the processing returns to step a1.

At step a11, the IDP control section 12 creates a job list based on the job list display instruction inputted via the IDP operation section 14 and causes the IDP display section 13 to display the created job list.

Next, at step a12, the IDP control section 12 extracts a job name or a preview image that is instructed to be selected by the user via the IDP operation section 14 with respect to the job list displayed on the IDP display section 13.

Next, at step a13, the IDP control section 12 causes an image formation instructing signal (printing execution job data) indicating an execution instruction of the image forming operation corresponding to the job name or the preview image that has been extracted to be transmitted via the IDP communication section 11.

Next, at step a14, the IDP control section 12 deletes the job name or the preview image corresponding to the image formation instructing signal that has been transmitted from the storage section.

At step a6 after it is judged that the end instruction of the drawing software program is inputted at step a5, the IDP control section 12 judges whether there is a job name or a preview image stored in the storage section. When it is judged that there is a job name or a preview image stored in the storage section, the processing proceeds to step a15, and when it is judged as not being stored, the processing ends.

At step a15, upon judging that the end instruction of the drawing software program is inputted at step a5, the IDP control section 12 causes a display operation end signal (meeting end job data) indicating the end instruction of the display operation of the image data in the display apparatus to be transmitted via the IDP communication section 11.

Next, at step a16, the IDP control section 12 deletes the job name or the preview image corresponding to the display operation end signal that has been transmitted from the storage section.

In the image forming system 100 configured as described above, the image forming operation corresponding to print job data transmitted from the specific display apparatus (IDP apparatus 1A) such as an information display is suspended once, so that it is possible to suppress wasteful power consumption, and further, the image forming operation corresponding to print job data transmitted from the display apparatuses 1B and 1C other than the IDP apparatus 1A is executed promptly without being suspended, so that it is possible to perform printing immediately for a print job that is needed to be printed immediately.

Figure 6:
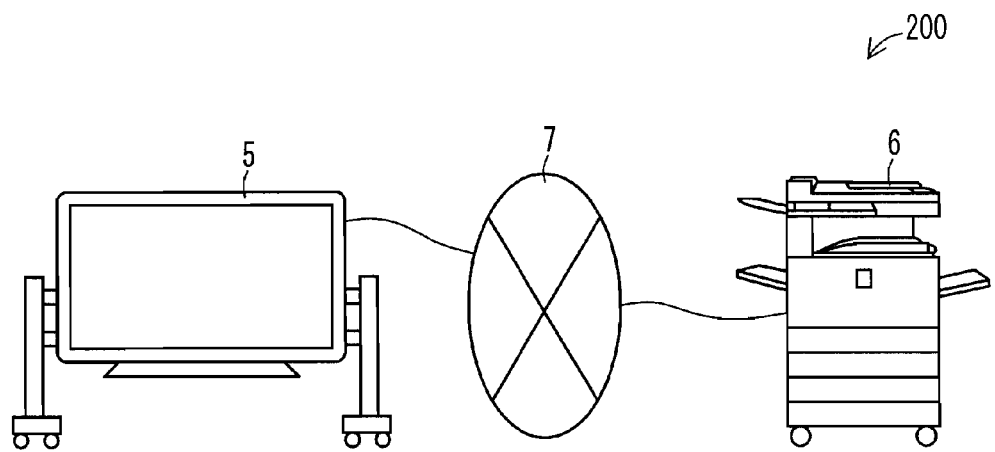
FIG. 6 is a view schematically showing a configuration of an image forming system according to a second embodiment.
Figure 7:
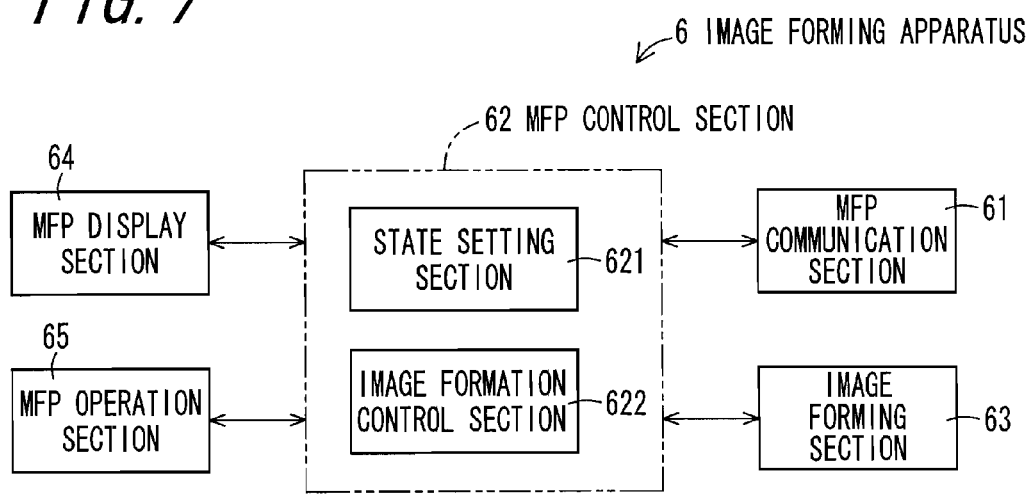
FIG. 7 is a block diagram showing a configuration of an image forming apparatus provided in the image forming system.
Figure 8:
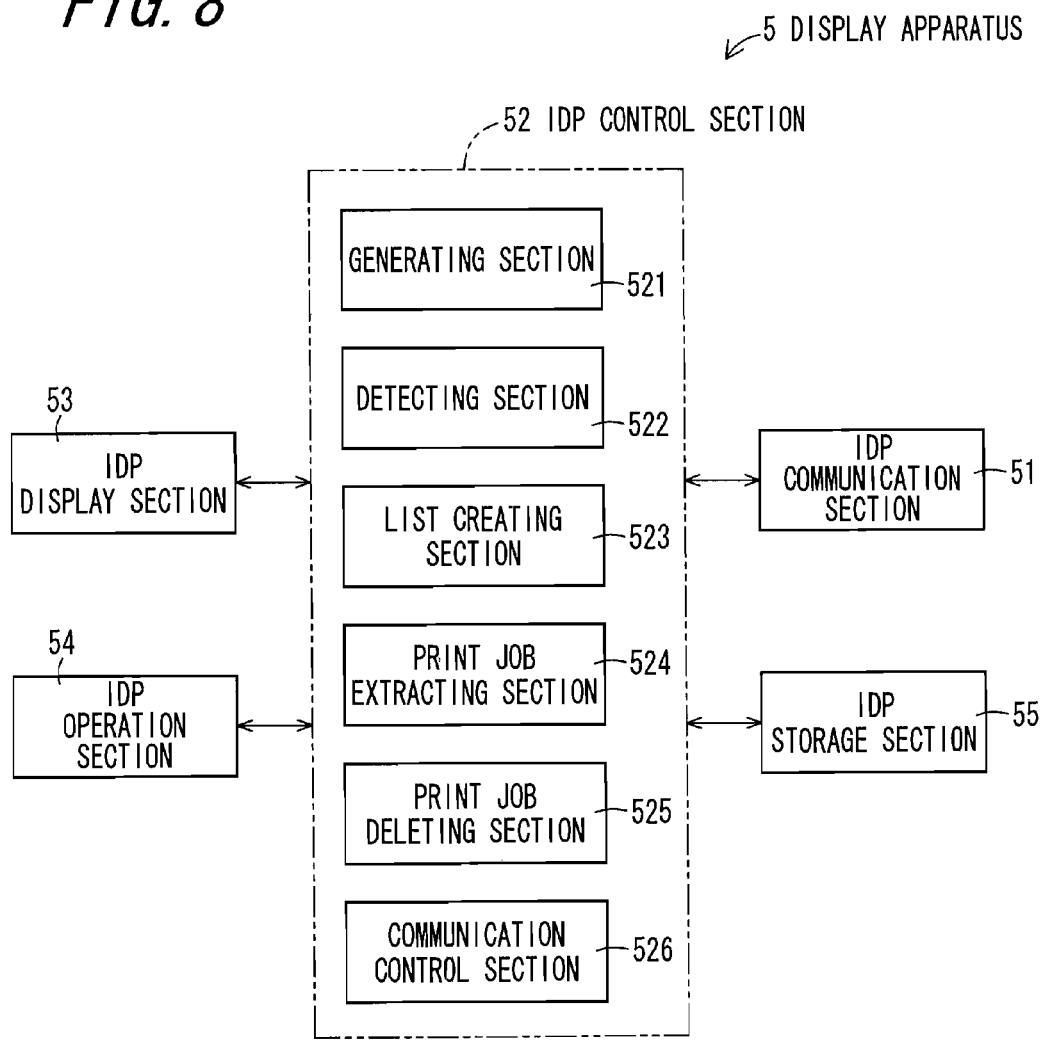
FIG. 8 is a block diagram showing a configuration of a display apparatus provided in the image forming system.

FIG. 6 is a view schematically showing a configuration of an image forming system 200 according to a second embodiment. FIG. 7 is a block diagram showing a configuration of an image forming apparatus 6 provided in the image forming system 200. FIG. 8 is a block diagram showing a configuration of a display apparatus 5 provided in the image forming system 200.

The image forming system 200 is a system comprising the display apparatus 5 capable of displaying image data and the image forming apparatus 6 for forming an image based on the image data on a recording medium such as recording paper, the display apparatus 5 and the image forming apparatus 6 being connected so as to allow data communication via a communication network 7.

The display apparatus 5 constituting the image forming system 200 is an information display (IDP) for displaying and explaining various information for a plurality of viewers at meetings, business presentations and the like. Note that, hereinafter, the display apparatus 5 may be referred to as an "IDP apparatus 5".

As shown in FIG. 8, the IDP apparatus 5 includes an IDP communication section 51, an IDP control section 52, an IDP display section 53, an IDP operation section 54, and an IDP storage section 55.

The IDP display section 53 and the IDP operation section 54 are realized by a so-called touch panel having a rectangular display face that is subjected to touch operation by a user, the touch panel being contained in a housing so as to expose the display face to the outside. The IDP display section 53 is for displaying an image based on image data created by various application programs. This IDP display section 53 is realized by a publicly known display device, for example, such as a liquid crystal display device including a liquid crystal panel and a backlight or an organic EL (Electro-Luminescence) display device.

The IDP operation section 54 is realized by a touch sensor placed on the IDP display section 53. The IDP operation section 54 realized by the touch sensor functions as a touched position detecting section, and is realized by, for example, a projection-type electrostatic capacitance sensor for outputting coordinate information corresponding to a touched position on the display face of touching operation performed on the display face of the IDP display section 53 by a user using a finger, a stylus or the like to the IDP control section 52. Such an IDP operation section 54 functions as an input section to which various instructions given by the user are inputted, and functions as an image editing section that executes drawing or deletion of handwritten characters or the like by the user with respect to an image based on the image data displayed on the IDP display section 53. Note that, a mouse and an operation keyboard provided in the IDP apparatus 5 also function as the IDP operation section 54.

As described below, in the IDP operation section 54, an execution instruction of an application program, a transmission instruction to transmit image data displayed on the IDP display section 53 to the image forming apparatus 6, an execution instruction of image forming operation, and an end instruction of display operation of image data in the display apparatus are inputted by the user respectively.

The IDP control section 52 is a processing section for controlling the operation of each section of the IDP apparatus 5, and is realized by, for example, a CPU (Central Processing Unit), a ROM (Read Only Memory) and a RAM (Random Access Memory). The IDP control section 52 executes an operating system (OS) program that realizes basic functions of the IDP apparatus 5 as well as executes various application programs such as a word processing software program, a spreadsheet software program, and a drawing software program.

The IDP control section 52 includes a generating section 521, a detecting section 522, a list creating section 523, a print job extracting section 524, a print job deleting section 525, and a communication control section 526.

The generating section 521 functions as an image formation job generating section, and each time a transmission instruction (instruction to transmit image data displayed on the IDP display section 53 to the image forming apparatus 6) is inputted to the IDP operation section 54 by the user, the generating section 521 adds identification information for identifying each image data to each image data corresponding to the transmission instruction respectively and generates print job data (image formation job). The print job data generated by the generating section 521 in this manner is stored in the IDP storage section 55.

The detecting section 522 detects a state of the display operation of the image data by the IDP display section 53. An example of the state of the display operation detected by the detecting section 522 includes a state of ending the display operation or the like. Such a state of ending the display operation by the IDP display section 53 is set based on the end instruction of the display operation that is inputted by the user via the IDP operation section 54. An example of the end instruction of the display operation includes an instruction to end a drawing software program in execution by the IDP control section 52 or the like.

When the state of the display operation detected by the detecting section 522 is the state of ending the display operation, the list creating section 523 creates a print job list indicating a list of print job data stored in the IDP storage section 55 and causes the IDP display section 53 to display the created print job list.

The print job extracting section 524 extracts print job data that is instructed to be selected by the user based on the print job list displayed on the IDP display section 53. The print job data extracted in this manner is transmitted to the image forming apparatus 6 via the IDP communication section 51 described below.

When the print job data is transmitted by the IDP communication section 51, the print job deleting section 525 deletes the transmitted print job data from the IDP storage section 55.

The communication control section 526 controls communication operation by the IDP communication section 51 based on a detection result by the detecting section 522. The communication control section 526 controls the communication operation by the IDP communication section 51, and when the state of the display operation detected by the detecting section 522 is a state where a predetermined condition is satisfied, the communication control section 526 causes the print job data stored in the IDP storage section 55 to be transmitted to the image forming apparatus 6.

More specifically, the communication control section 526 controls the communication operation by the IDP communication section 51, and when the state of the display operation detected by the detecting section 522 is a state of ending the display operation, the communication control section 526 judges that the predetermined condition is satisfied and causes the print job data stored in the IDP storage section 55 to be transmitted to the image forming apparatus 6. Further, when the print job data is extracted by the print job extracting section 524, the communication control section 526 controls the communication operation by the IDP communication section 51 to cause the extracted print job data to be transmitted to the image forming apparatus 6.

The IDP communication section 51 performs transmission or reception of various data to or from the image forming apparatus 6 connected via the communication network 7. This IDP communication section 51 is controlled by the communication control section 526 to transmit the print job data to the image forming apparatus 6.

Next, description will be given for the image forming apparatus 6 included in the image forming system 200. The image forming apparatus 6 such as an MFP (Multi Function Printer) is an apparatus that forms (prints) an image based on image data displayed on the IDP apparatus 5 on a recording medium such as recording paper. Note that, hereinafter, the image forming apparatus 6 may be referred to as an "MFP apparatus 6".

As shown in FIG. 7, the MFP apparatus 6 includes an MFP communication section 61, an MFP control section 62, an image forming section 63, an MFP display section 64, and an MFP operation section 65.

The MFP display section 64 and the MFP operation section 65 are realized by, for example, a display device provided with a touch panel. The MFP operation section 65 functions as an input section to which various instructions given by a user are inputted. The MFP display section 64 displays an operation key image indicating an input position of various instructions inputted by the MFP operation section 65, a preview image corresponding to an image to be printed, and the like.

The MFP communication section 61 performs transmission or reception of various data to or from the IDP apparatus 5 connected via the communication network 7. This MFP communication section 61 receives print job data transmitted by the IDP communication section 51 of the IDP apparatus 5.

The image forming section 63 forms (prints) an image based on the image data included in the print job data on a recording medium by heating and pressing with an electrophotographic system. The image forming operation by the image forming section 63 is controlled by an image formation control section 622 described below.

The MFP control section 62 is a processing section for controlling the operation of each section of the MFP apparatus 6, and is realized by, for example, a CPU (Central Processing Unit), a ROM (Read Only Memory) and a RAM (Random Access Memory). This MFP control section 62 includes a state setting section 621 and the image formation control section 622.

The image formation control section 622 controls the image forming operation for a recording medium by the image forming section 63. The image formation control section 622 controls the image forming operation by the image forming section 63 to cause an image based on image data included in the print job data received via the MFP communication section 61 to be formed on a recording medium.

The state setting section 621 sets a state of the image forming section 63 to either an image formation enabled state or a power-saving state (energy-saving mode) in which power consumption is reduced compared to the image formation enabled state. The state setting section 621 sets the image forming section 63 to the power-saving state (energy-saving mode) during a period when the image formation control section 622 is not causing the image forming operation by the image forming section 63 to be executed. Further, the state setting section 621 returns the image forming section 63 from the power-saving state (energy-saving mode) to set to the image formation enabled state during a period when the image formation control section 622 is causing the image forming operation by the image forming section 63 to be executed.

Next, description will be given for processing of the IDP apparatus 5 (display apparatus 5) as to image processing in the image forming system 200 configured as described above.

Figure 9:
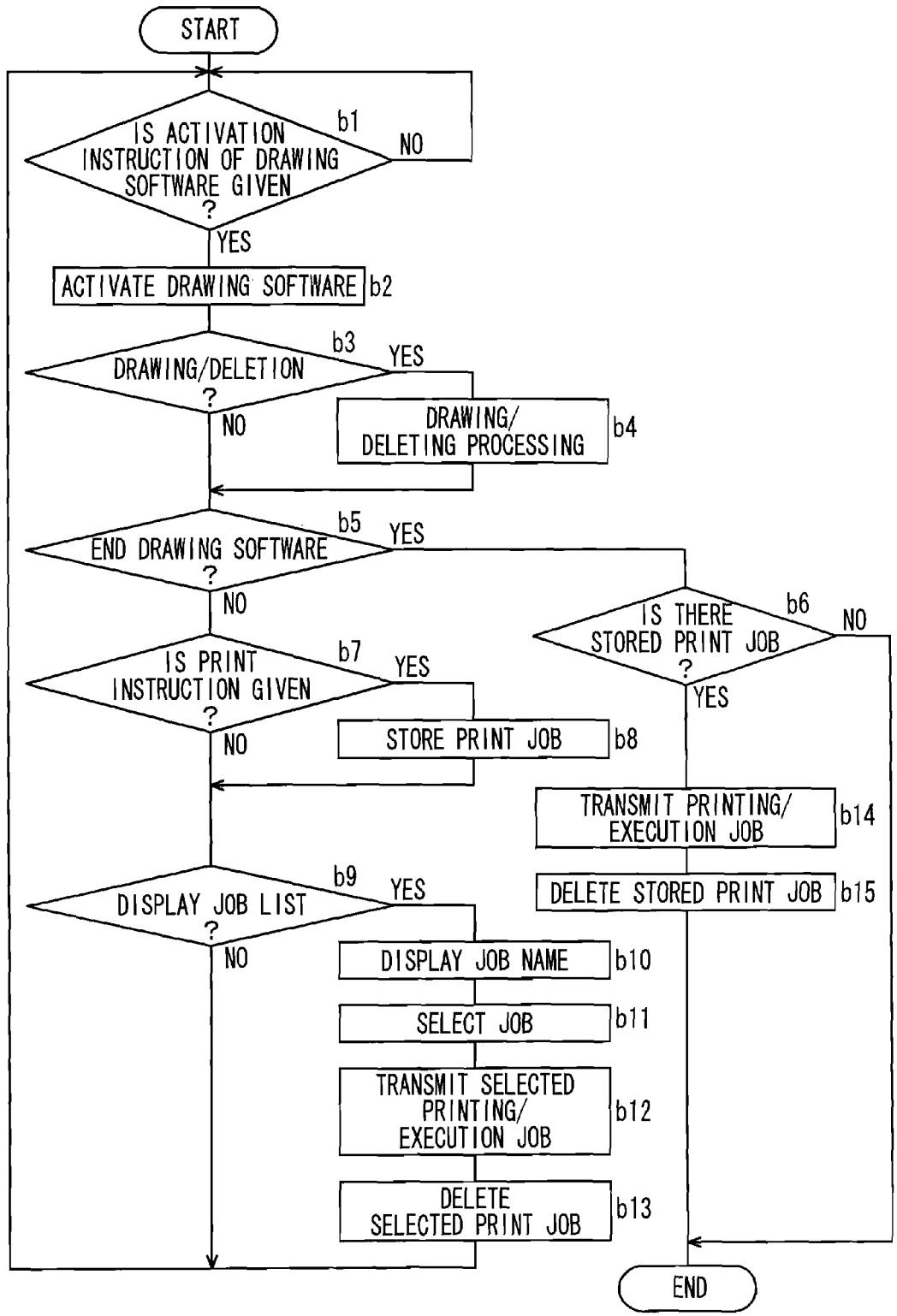
FIG. 9 is a flowchart showing processing of the display apparatus in the image forming system.

FIG. 9 is a flowchart showing processing of the IDP apparatus 5 (display apparatus 5) in the image forming system 200.

At step b1, the IDP control section 52 judges whether an activation instruction of a drawing software program for executing editing processing with respect to image data displayed on the IDP display section 53 is inputted via the IDP operation section 54. When it is judged that the activation instruction of the drawing software program is inputted, the processing proceeds to step b2, and when it is judged that the activation instruction is not inputted, step b1 is repeated.

At step b2, the IDP control section 52 activates the drawing software program. Next, at step b3, the IDP control section 52 judges whether an edit instruction of drawing or deletion using drawing software is inputted via the IDP operation section 54. When it is judged that the edit instruction is inputted, the processing proceeds to step b4, and when it is judged that the edit instruction is not inputted, the processing proceeds to step b5.

At step b4, the IDP control section 52 executes editing processing for the image data displayed on the IDP display section 53 based on the edit instruction inputted via the IDP operation section 54. When the editing processing is executed in this manner and the editing processing is completed, the IDP control section 52 operates so that the processing proceeds to step b5.

At step b5, the IDP control section 52 judges whether an end instruction of the drawing software program is inputted via the IDP operation section 54. When it is judged that the end instruction of the drawing software program is inputted, the processing proceeds to step b6, and when it is judged that the end instruction is not inputted, the processing proceeds to step b7.

At step b7, the IDP control section 52 judges whether a transmission instruction to transmit the image data displayed on the IDP display section 53 to the MFP apparatus 6 is inputted via the IDP operation section 54. When it is judged that the transmission instruction is inputted, the processing proceeds to step b8, and when it is judged that the transmission instruction is not inputted, the processing proceeds to step b9.

At step b8, each time the transmission instruction of image data is inputted via the IDP operation section 54, the generating section 521 of the IDP control section 52 adds identification information for identifying the image data to each image data corresponding to the transmission instruction respectively and generates print job data. Then, the IDP control section 52 causes the DIP storage section 55 to store the print job data generated by the generating section 521.

Next, at step b9, the IDP control section 52 judges whether a job list display instruction to cause the IDP display section 53 to display a print job list indicating a list of print job data is inputted via the IDP operation section 54. When it is judged that the job list display instruction is inputted, the processing proceeds to step b10, and when it is judged that the job list display instruction is not inputted, the processing returns to step b1.

At step b10, the list creating section 523 of the IDP control section 52 creates a print job list based on the job list display instruction inputted via the IDP operation section 54 and causes the IDP display section 53 to display the created print job list.

Next, at step b11, the print job extracting section 524 of the IDP control section 52 extracts print job data that is instructed to be selected by the user via the IDP operation section 54 with respect to the print job list displayed on the IDP display section 53.

Next, at step b12, the communication control section 526 controls communication operation by the IDP communication section 51 to cause the print job data extracted by the print job extracting section 524 to be transmitted to the MFP apparatus 6.

Next, at step b13, the print job deleting section 525 of the IDP control section 52 deletes the print job data that has been transmitted by the IDP communication section 51 from the IDP storage section 55.

At step b6 after it is judged that the end instruction of the drawing software program is inputted at step b5, the IDP control section 52 judges whether there is print job data stored in the IDP storage section 55. When it is judged that there is print job data stored in the IDP storage section 55, the processing proceeds to step b14, and when it is judged as not being stored, the processing ends.

At step b14, upon judging that the end instruction of the drawing software program is inputted at step b5, based on detecting the state of ending the display operation by the detecting section 522, the communication control section 526 controls the communication operation of the IDP communication section 51 to cause the print job data stored in the IDP storage section 55 to be transmitted to the MFP apparatus 6.

Next, at step b15, the print job deleting section 525 of the IDP control section 52 deletes the print job data that has been transmitted from the IDP storage section 55.

The image forming system 200 configured as described above is not configured so that the MFP apparatus 6 suspends the image forming operation corresponding to print job data once, but configured so that the display apparatus (IDP apparatus 5) such as an information display stores print job data including image data corresponding to a transmission instruction by a user in the IDP storage section 55 once without transmitting to the MFP apparatus 6 immediately. Further, at the time when receiving the print job data transmitted from the IDP apparatus 5, the MFP apparatus 6 executes the image forming operation for a recording medium. This makes it possible to suppress wasteful power consumption as well as to perform printing immediately for a print job that is needed to be printed immediately.

The technology may be embodied in other specific forms without departing from the spirit or essential characteristics thereof. The present embodiments are therefore to be considered in all respects as illustrative and not restrictive, the scope of the technology being indicated by the appended claims rather than by the foregoing description and all changes which come within the meaning and the range of equivalency of the claims are therefore intended to be embraced therein.

What is claimed is:

1. An image forming system comprising:
   a plurality of display apparatuses including a specific display apparatus capable of displaying an image based on image data, the specific display apparatus being an information display; and
   an image forming apparatus which forms the image on a recording medium, the plurality of display apparatuses and the image forming apparatus being connected so as to allow data communication,
   each of the plurality of display apparatuses including a display section which displays the image based on the image data,
   a transmission instruction input section to which a transmission instruction to transmit the image data of the image displayed on the display section to the image forming apparatus is inputted,
   an image formation job generating section which adds identification information for identifying a display apparatus on which the image is displayed, to image data which is a target for the transmission instruction, and generates an image formation job for causing the image forming apparatus to perform image formation of the image based on the image data, when the transmission instruction is inputted to the transmission instruction input section, and
   a transmitting section which transmits the image formation job generated by the image formation job generating section, to the image forming apparatus, and
   the image forming apparatus including
   a receiving section which receives the image formation job transmitted by the transmitting section,
   an image forming section which forms the image based on the image data included in the image formation job received by the receiving section on the recording medium,
   a judging section which judges whether a display apparatus corresponding to the image formation job is the specific display apparatus, based on the identification information included in the image formation job, and
   a control section which controls image forming operation for the recording medium by the image forming section, based on a judgment result of the judging section,
   when the judging section judges as being the specific display apparatus, the control section suspending the image forming operation by the image forming section once, and then, when a predetermined condition is to cause the image forming operation to be executed, and
   when the judging section judges as not being the specific display apparatus, the control section causing the image forming operation by the image forming section to be executed without being suspended.

2. An image forming apparatus connected to a plurality of display apparatuses including a specific display apparatus so as to allow data communication, the specific display apparatus being an information display, each of the plurality of display apparatuses including a display section capable of displaying an image based on image data, an image formation job generating section which adds identification information for identifying each of the plurality of display apparatuses to each of the image data and generates an image formation job for causing the image forming apparatus to perform image formation of the image based on the image data, and a transmitting section for transmitting the image formation job, the image forming apparatus comprising:
   a receiving section which receives the image formation job transmitted by each transmitting section of each of the display apparatuses;
   an image forming section which forms the image based on the image data included in the image formation job received by the receiving section on a recording medium;
   a judging section which judges whether a display apparatus corresponding to the image formation job is the specific display apparatus, based on identification information included in the image formation job; and a control section which controls image forming operation for the recording medium by the image forming section, based on a judgment result of the judging section, when the judging section judges as being the specific display apparatus, the control section suspending the image forming operation by the image forming section once, and then, when a predetermined condition is to cause the image forming operation to be executed, and when the judging section judges as not being the specific display apparatus, the control section causing the image forming operation by the image forming section to be executed without being suspended.

3. The image forming apparatus according to claim 2, further comprising:

a state setting section which sets a state of the image forming section to either an image formation enabled state or a power-saving state in which power consumption is reduced compared to the image formation enabled state, wherein during a period when the control section is suspending the image forming operation by the image forming section, the state setting section sets the image forming section to the power-saving state, and during a period when the control section is causing the image forming operation by the image forming section to be executed, the state setting section sets the image forming section to the image formation enabled state.

4. The image forming apparatus according to claim 3, wherein the plurality of display apparatuses are configured so as to be able to transmit an image formation instructing signal indicating an execution instruction of the image forming operation, the image forming apparatus further comprises an instructing signal reception judging section which judges whether the image formation instructing signal transmitted from the specific display apparatus is received via the receiving section, and when it is judged by the instructing signal reception judging section that the image formation instructing signal is received, the control section judges that the predetermined condition is satisfied, and cancels the suspension of the image forming operation which is carried out by the image forming section and corresponds to the image formation job transmitted from the specific display apparatus.

5. The image forming apparatus according to claim 3, wherein the plurality of display apparatuses are configured so as to be able to transmit a display operation end signal indicating to end display operation of the image therein, the image forming apparatus further comprises an end signal reception judging section which judges whether the display operation end signal transmitted from the specific display apparatus is received via the receiving section, and when it is judged by the end signal reception judging section that the display operation end signal is received, the control section judges that the predetermined condition is satisfied, and cancels the suspension of the image forming operation which is carried out by the image forming section and corresponds to the image formation job transmitted from the specific display apparatus.

6. The image forming apparatus according to claim 2, wherein the plurality of display apparatuses are configured so as to be able to transmit an image formation instructing signal indicating an execution instruction of the image forming operation, the image forming apparatus further comprises an instructing signal reception judging section which judges whether the image formation instructing signal transmitted from the specific display apparatus is received via the receiving section, and when it is judged by the instructing signal reception judging section that the image formation instructing signal is received, the control section judges that the predetermined condition is satisfied, and cancels the suspension of the image forming operation which is carried out by the image forming section and corresponds to the image formation job transmitted from the specific display apparatus.

7. The image forming apparatus according to claim 2, wherein the plurality of display apparatuses are configured so as to be able to transmit a display operation end signal indicating to end display operation of the image therein, the image forming apparatus further comprises an end signal reception judging section which judges whether the display operation end signal transmitted from the specific display apparatus is received via the receiving section, and when it is judged by the end signal reception judging section that the display operation end signal is received, the control section judges that the predetermined condition is satisfied, and cancels the suspension of the image forming operation which is carried out by the image forming section and corresponds to the image formation job transmitted from the specific display apparatus.

\* \* \* \* \*